Feb. 24, 1925.

A. EHRINGHAUS 1,527,848

ANALYZER PRISM

Filed Aug. 29, 1921

Inventor:
Arthur Ehringhaus

Patented Feb. 24, 1925.

1,527,848

UNITED STATES PATENT OFFICE.

ARTHUR EHRINGHAUS, OF GOTTINGEN, GERMANY, ASSIGNOR TO THE FIRM OF R. WINKEL G. M. B. H., OF GOTTINGEN, GERMANY.

ANALYZER PRISM.

Application filed August 29, 1921. Serial No. 496,733.

*To all whom it may concern:*

Be it known that I, ARTHUR EHRINGHAUS, a citizen of the German Empire, and residing at Gottingen, Germany, have invented a new and useful Analyzer Prism (for which I have filed an application in Germany, April 7, 1920), of which the following is a specification.

The present invention relates to an analyzer prism which is designed for a tube-analyzer for microscopes, either for observation or for photograhpic or projection work. In order to obviate, whilst using a tube-analyzer, the troubles, which with the use of an ordinary analyzer prism are caused by the astigmatism resulting from the same, it has been suggested in the German Patent Specification 296,000 (in the event of the orthoscopic use) to dispose in front of the prism a dispersive lens which renders the ray pencils, emanating from the different object-points and converging behind the microscope objective, parallel, and to dispose behind the pism a collective lens imparting again the original convergence to the ray pencils emerging parallel from the prism. The addition of two such lenses to the analyzer prism has the drawback that the analyzer then consisting of the prism and the two lenses cannot owing to the increase of its length, as a rule, be brought through the same lateral opening of the microscope tube into the latter which opening was hitherto sufficient for introducing the mere prism.

According to the invention the length can frequently be limited already in a sufficient way without impairing the optical effect, by dispensing with one of the two lenses and by attaining their effect by means of so devising the respective end-surface of the prism as to be dispersive or collective, according to the necessity of replacing the dispersive or the collective lens. In that case the respective surface may be a spherical surface or another surface of rotation (having the longitudinal axis of the prism as an axis of rotation).

The shortest length, viz, a length equal to that of the single prism, is obtained by also dispensing with the other lens and by devising the respective end-surface of the prism in such a way that it replaces this lens; hence this other end-surface becomes collective, if the first-mentioned one be dispersive, and vice versa.

For conoscopic use the path of rays is influenced just in the opposite manner; it has accordingly been suggested in the German Patent Specification 315149 to dispose in front of the analyzer prism a collective lens and behind the prism a dispersive lens. According to the invention the analyzer prism can also be constructed for this kind of use. In that case it is always necessary to provide at the front end of the prism for a collective effect in order to allow the pencil, emerging from the rear focal point of the microscope objective, of entering the prism by parallel rays. At the rear end it is necessary to provide for a dispersive effect if the pencil, emerged from the prism, is to be given again the original divergence. In that case the same Amici-Bertrand lens is to be used at the back which, with the use of an ordinary analyzer prism, is destined to make the rays forming the aforesaid pencil intersect each other in the front focal plane of the microscope-ocular. If only one Amici-Bertrand lens of inferior refractive power is to be used, the rear end-surface of the prism is to be given a correspondingly slighter dispersive effect. With a certain refractive power of the Amici-Bertrand lens it is necessary to give the rear end-surface of the prism the refractive power zero, i. e. to leave the surface plane; in the event of a still inferior refractice power of the lens the end-surface is even to be given a collective effect, and, finally, the lens may even be dispensed with entirely by giving the rear end-surface of the prism a sufficiently powerful collective effect.

In the annexed drawing the invention is illustrated by several constructional examples. Figs. 1 to 3 relate to the orthoscopic path of rays; Fig. 1 shows a prism with dispersive front surface and plane rear surface, Fig. 2 a prism with plane front surface and collective rear surface, Fig. 3 a prism with dispersive front surface and collective rear surface. Figs. 4 to 7 relate to the conoscopic path of rays; Fig. 4 shows a prism with collective front surface and plane rear surface, Fig. 5 a prism with plane front surface and dispersive rear surface, Fig. 6 a prism with collective front surface and plane rear surface, Fig. 7 a prism with collective front surface and collective rear surface.

Fig. 1 shows an example for orthoscopic use. An analyzer prism $a^1$ is provided at its front end-surface with a dispersive cavity $b^1$; behind the prism there is a collective lens $c^1$. The plane of the object to be examined is denoted by XX; the microscope objective consists of the lenses $d$ and $e$, the (Huggenian) ocular of the lenses $f$ and $g$. The dispersive effect of the cavity $b^1$ is so chosen that the convergent pencil of rays thrown upon the front end-surface of the prism penetrates the prism by parallel rays; the collective effect of the lens $c^1$ is so chosen that the original convergence is restored again.

Fig. 2 shows as a substitute for the prism $a^1$ along with the lens $c^1$ of Fig. 1 a prism $a^2$, in front of which a dispersive lens $b^2$ is disposed and the rear end-surface of which $c^2$ is so devised as to be collective.

Fig. 3 shows as a substitute for the prism $a^1$ along with the lens $c^1$ of Fig. 1 a prism $a^3$, which has at its front end-surface a dispersive cavity $b^1$ and the rear end-surface $c^2$ of which is so devised as to be collective.

Figure 1:
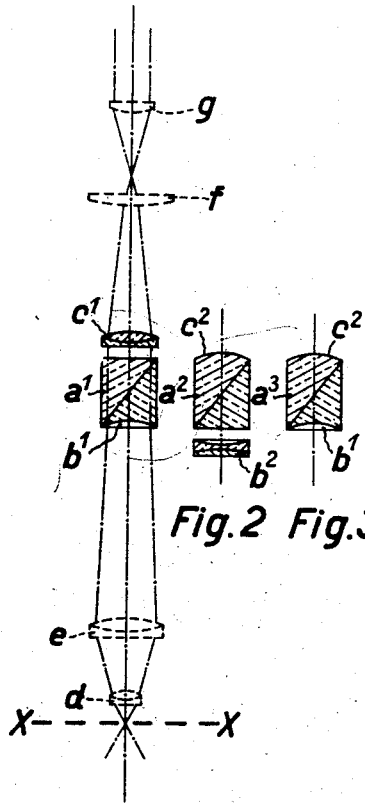
Figure 4:
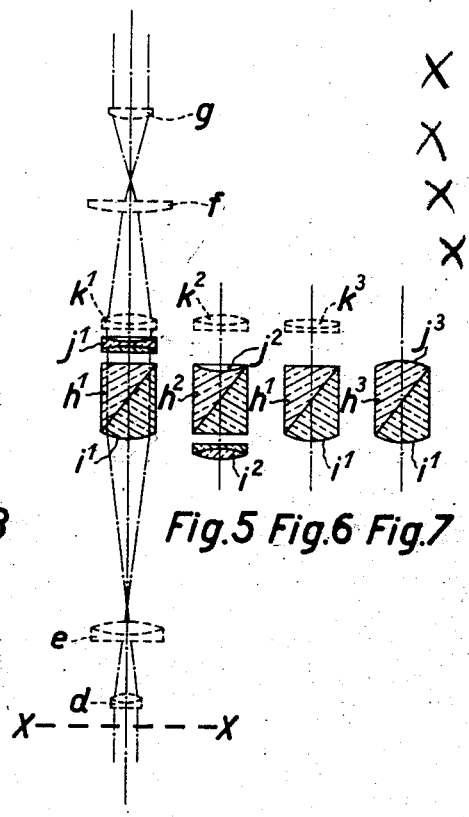

Fig. 4 shows an example for conoscopic use. An analyzer prism $h^1$ is so devised as to be collective at its front end-surface $i^1$; behind the prism a dispersive lens $j^1$ is disposed. The plane of the object to be examined is again denoted by XX, and the lenses $d$, $e$, $f$ and $g$ correspond to those of Fig. 1. A lens $k^1$ (Amici-Bertrand) disposed behind the lens $j^1$ serves for bringing about in the front focal plane of the ocular an image of the interference-image arising in the rear focal plane of the objective.

Fig. 5 shows as a substitute for the prism $h^1$ as well as the lenses $j^1$ and $k^1$ of Fig. 4 a prism $h^2$, the front end-surface of which is plane, in front of which a collective lens $i^2$ is disposed, the rear end-surface $j^2$ of which is so devised as to be dispersive and behind which a collective lens $k^2$ is disposed, the refractive power of which is about equal to that of the lens $k^1$.

Fig. 6 shows as a substitute for the prism $h^1$ as well as the lenses $j^1$ and $k^1$ of Fig. 4 a prism $h^1$ agreeing with the prism $h^1$ of Fig. 4 as well as a collective lens $k^3$ disposed behind this prism, which lens is less powerful than the lens $k^1$.

Fig. 7 shows as a substitute for the prism $h^1$ as well as the lenses $j^1$ and $k^1$ a prism $h^3$, the front end-surface $i^1$ and the rear end-surface $j^3$ of which are so devised as to be collective.

I claim:

1. Analyzer prism for microscopes, one end-surface of this prism being a curved surface which is formed by a surface of rotation, the axis of the latter coinciding with the longitudinal axis of the prism.

2. Analyzer prism for microscopes, both end-surfaces of which are curved surfaces which are formed each by a surface of rotation, the axis of the latter coinciding with the longitudinal axis of the prism.

3. Analyzer prism for microscopes, one end-surface of this prism being a concave surface of rotation, the axis of the latter coinciding with the longtiudinal axis of the prism.

4. Analyzer prism for microscopes, one end-surface of this prism being a convex surface of rotation, the axis of the latter coinciding with the longitudinal axis of the prism.

5. Analyzer prism for microscopes, one end-surface of this prism being a concave surface of rotation, and the other end-surface of the said prism being a convex surface of rotation, the axis of each of the two surfaces of rotation coinciding with the longitudinal axis of the prism.

ARTHUR EHRINGHAUS.